US012498656B2

(12) United States Patent
Imada et al.

(10) Patent No.: US 12,498,656 B2
(45) Date of Patent: Dec. 16, 2025

(54) FIXING DEVICE AND IMAGE FORMING APPARATUS

(71) Applicants: Takahiro Imada, Kanagawa (JP); Yuusuke Furuichi, Kanagawa (JP); Hitoshi Fujiwara, Kanagawa (JP)

(72) Inventors: Takahiro Imada, Kanagawa (JP); Yuusuke Furuichi, Kanagawa (JP); Hitoshi Fujiwara, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/945,598

(22) Filed: Nov. 13, 2024

(65) Prior Publication Data

US 2025/0172890 A1 May 29, 2025

(30) Foreign Application Priority Data

Nov. 28, 2023 (JP) ................................ 2023-200284

(51) Int. Cl.
*G03G 15/20* (2006.01)
*G03G 21/16* (2006.01)
*G03G 21/20* (2006.01)

(52) U.S. Cl.
CPC ..... *G03G 15/2017* (2013.01); *G03G 15/2039* (2013.01); *G03G 15/2064* (2013.01); *G03G 21/1647* (2013.01); *G03G 21/206* (2013.01); *G03G 2215/2035* (2013.01)

(58) Field of Classification Search
None
See application file for complete search history.

(56) References Cited

U.S. PATENT DOCUMENTS

2012/0183322 A1* 7/2012 Sato .................. G03G 15/0194 399/117
2014/0212191 A1 7/2014 Matsusaka et al.
2015/0309468 A1* 10/2015 Sone ..................... G03G 15/80 347/118
2019/0004458 A1* 1/2019 Muramatsu ........... H02H 5/042
(Continued)

FOREIGN PATENT DOCUMENTS

JP S63-161477 A 7/1988
JP H05-323754 A 12/1993
(Continued)

*Primary Examiner* — Sevan A Aydin
(74) *Attorney, Agent, or Firm* — XSENSUS LLP

(57) ABSTRACT

A fixing device includes a fixing rotator having a hollow portion inside the fixing rotator, a fixing cover, a pressure rotator contacting the fixing rotator to form a fixing nip, an electric component, and a harness. The fixing cover covers the fixing rotator and extends from one end to another end in a longitudinal direction of the fixing cover. The electric component is inside the hollow portion of the fixing rotator. The harness is connected to the electric component at a connection portion. The harness extends from the connection portion toward one end of the fixing cover outside the fixing rotator in the longitudinal direction and folds back and extends toward said another end of the fixing cover in the longitudinal direction through one of a route inside the fixing cover between the fixing rotator and an inner face of the fixing cover and a route outside the fixing cover.

14 Claims, 7 Drawing Sheets

(56) References Cited

U.S. PATENT DOCUMENTS

| | | | | |
|---|---|---|---|---|
| 2020/0019083 | A1* | 1/2020 | Ishidate | G03G 15/04036 |
| 2023/0367246 | A1* | 11/2023 | Furuichi | G03G 15/2064 |
| 2024/0036512 | A1* | 2/2024 | Nada | G03G 15/2017 |
| 2024/0255892 | A1 | 8/2024 | Imada et al. | |
| 2024/0319640 | A1* | 9/2024 | Kabata | G03G 15/2039 |
| 2024/0319641 | A1* | 9/2024 | Andoh | G03G 15/2053 |
| 2025/0208563 | A1* | 6/2025 | Katayama | G03G 15/0849 |

FOREIGN PATENT DOCUMENTS

| | | | |
|---|---|---|---|
| JP | 2011-203530 | A | 10/2011 |
| JP | 2014-145966 | A | 8/2014 |
| JP | 2017-058449 | A | 3/2017 |
| JP | 2021-162835 | A | 10/2021 |

* cited by examiner

FIXING DEVICE AND IMAGE FORMING APPARATUS

CROSS-REFERENCE TO RELATED APPLICATION

This patent application is based on and claims priority pursuant to 35 U.S.C. § 119(a) to Japanese Patent Application No. 2023-200284, filed on Nov. 28, 2023, in the Japan Patent Office, the entire disclosure of which is hereby incorporated by reference herein.

BACKGROUND

Technical Field

Embodiments of the present disclosure relate to a fixing device that heats a toner image to fix the toner image onto the surface of a sheet and an image forming apparatus including the fixing device, such as a copier, a printer, a facsimile machine, or a multifunction peripheral having at least two of copying, printing, and facsimile functions.

Related Art

One type of image forming apparatus such as a copier and a printer known in the art includes a fixing device including a fixing rotator such as a fixing belt and an electric component such as a heater or a thermistor disposed inside (in a hollow portion of) the fixing rotator. In such a fixing device, a harness including lead wires is arranged to supply electric power to the electric component.

SUMMARY

This specification describes an improved fixing device that includes a fixing rotator, a fixing cover, a pressure rotator, an electric component, and a harness. The fixing rotator has a hollow portion inside the fixing rotator. The fixing cover covers the fixing rotator and extends from one end to another end in a longitudinal direction of the fixing cover. The pressure rotator contacts the fixing rotator to form a fixing nip. The electric component is disposed inside the hollow portion of the fixing rotator. The harness is connected to the electric component at a connection portion. The harness extends from the connection portion toward one end of the fixing cover outside the fixing rotator in the longitudinal direction, and folds back and extends toward said another end of the fixing cover in the longitudinal direction through one of a route inside the fixing cover between the fixing rotator and an inner face of the fixing cover and a route outside the fixing cover.

This specification also describes an improved fixing device that includes a fixing rotator, a fixing cover, a pressure rotator, an electric component, and a harness. The fixing cover covers the fixing rotator and extends from one end to another end in a longitudinal direction of the fixing cover. The pressure rotator contacts the fixing rotator to form a fixing nip. The electric component is disposed between the fixing rotator and the fixing cover. The harness is connected to the electric component at a connection portion. The harness extends from the connection portion toward one end of the fixing cover outside the fixing rotator in the longitudinal direction and folds back and extends toward said another end of the fixing cover in the longitudinal direction through one of a route inside the fixing cover between the fixing rotator and an inner face of the fixing cover and a route outside the fixing cover.

This specification further describes an image forming apparatus that includes the fixing device.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
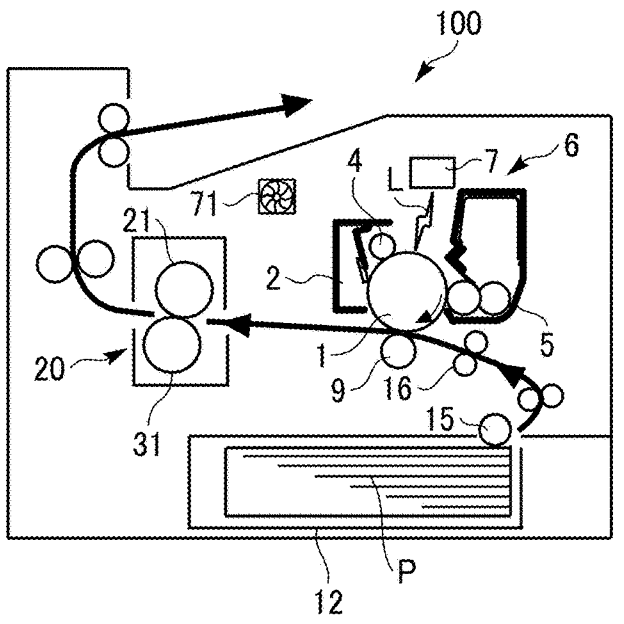
FIG. 1 is a diagram illustrating an overall configuration of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms “a,” “an,” and “the” are intended to include the plural forms as well, unless the context clearly indicates otherwise.

Referring to the drawings, embodiments of the present disclosure are described below. Like reference signs are assigned to identical or equivalent components and a description of those components may be simplified or omitted. As one example of a heating device, the following describes a fixing device to fix an image onto a recording medium.

With reference to FIG. 1, the configuration and operation of an image forming apparatus 100 are described below.

In FIG. 1, the image forming apparatus 100 such as a printer includes a process cartridge 6, an exposure device 7, a transfer roller 9, a sheet feeder 12, a registration roller pair 16 as a timing roller pair, and a fixing device 20. The process cartridge 6 is configured as a unit including a photoconductor drum 1, a charging roller 4 as a charging device, a developing device 5, and a cleaning device 2. The exposure device 7 irradiates the photoconductor drum 1 with exposure light L that is generated based on image data input from an input device such as a personal computer. A toner image is formed on the photoconductor drum 1. The sheet feeder 12 includes a feed tray to store sheets P. The registration roller pair 16 conveys a sheet P toward a transfer nip where the photoconductor drum 1 and the transfer roller 9 contact each other. The transfer roller 9 transfers the toner image borne on the photoconductor drum 1 onto the sheet P conveyed to the transfer nip (that is, a transfer position). The fixing device 20 fixes the toner image that has not yet been fixed, to the sheet P.

The charging roller 4 as the charging device, the developing device 5, and the cleaning device 2 are arranged around the photoconductor drum 1. These members (the photoconductor drum 1, the charging roller 4, the developing device 5, and the cleaning device 2) are integrated as the process cartridge 6 and are detachably (replaceably) attached to the body of the image forming apparatus 100. The process cartridge 6 is removed from the body of the image forming apparatus 100 and replaced with a new one (or a process cartridge subjected to maintenance) when a predetermined replacement cycle is reached or when maintenance is performed.

With reference to FIG. 1, image forming processes (printing processes) of the image forming apparatus 100 are described below.

The input device such as the personal computer sends the image data to the exposure device 7 in the image forming apparatus 100, and the exposure device 7 irradiates the surface of the photoconductor drum 1 with the exposure light (a laser beam) L based on the image data.

A drive motor disposed in the body of the image forming apparatus 100 rotates the photoconductor drum 1 in the direction indicated by the arrow in FIG. 1 (clockwise). Initially, the charging roller 4 uniformly charges the surface of the photoconductor drum 1 at a position at which the surface of the photoconductor drum 1 faces the charging roller 4, which is called a charging process. As a result, a charging potential is formed on the surface of the photoconductor drum 1. In the present embodiment, the charging potential on the photoconductor drum 1 is approximately −900 V. Subsequently, the charged surface of the photoconductor drum 1 reaches an irradiation position of the exposure light L. An electric potential at the position that receives the exposure light L changes to a latent image potential (about 0 to −100 V), and an electrostatic latent image is formed on the surface of the photoconductor drum 1, which is called an exposure process.

The surface of the photoconductor drum 1 bearing the electrostatic latent image thereon then reaches a position opposite the developing device 5. The developing device 5 supplies toner onto the photoconductor drum 1, and the latent image formed on the photoconductor drum 1 is thereby developed into a toner image, which is called a developing process.

After the developing process, the surface of the photoconductor drum 1 bearing the toner image thereon reaches the transfer nip (that is, the transfer position) formed between the photoconductor drum 1 and the transfer roller 9. In the transfer nip, a transfer bias having a polarity opposite the polarity of the toner is applied from a power source to the transfer roller 9, thereby transferring the toner image formed on the photoconductor drum 1 onto the sheet P conveyed by the registration roller pair 16, which is called a transfer process.

The surface of the photoconductor drum 1 after the transfer process reaches a position opposite the cleaning device 2. At the position opposite the cleaning device 2, a cleaning blade 2*a* (see FIG. 2) mechanically removes untransferred toner remaining on the surface of the photoconductor drum 1, and removed toner is collected in the cleaning device 2, which is called a cleaning process.

Thus, a series of image forming processes on the photoconductor drum 1 is completed.

The sheet P is conveyed to the transfer nip between the photoconductor drum 1 and the transfer roller 9 as follows.

First, a feed roller 15 feeds the uppermost sheet P of the stack of sheets P stored in the sheet feeder 12 toward a conveyance passage.

Subsequently, the sheet P reaches the registration roller pair 16. The sheet P that has reached the registration roller pair 16 is conveyed to the transfer nip (the contact position of the transfer roller 9 with the photoconductor drum 1) in synchronization with an entry of the toner image formed on the photoconductor drum 1 into the transfer nip.

After the sheet P passes through the transfer nip (i.e., the position of the transfer roller 9) in the transfer process, the sheet P reaches the fixing device 20 through the conveyance passage. In the fixing device 20, the sheet P is interposed between a fixing belt 21 and a pressure roller 31. The toner image is fixed on the sheet P by heat applied from the fixing belt 21 and pressure applied from both the fixing belt 21 and the pressure roller 31. After the sheet P having the fixed toner image thereon is ejected from the fixing nip formed between the fixing belt 21 and the pressure roller 31, the sheet P is ejected from the body of the image forming apparatus 100 and stacked on an output tray.

Thus, a series of the image forming processes (printing processes) is completed.

Figure 2:
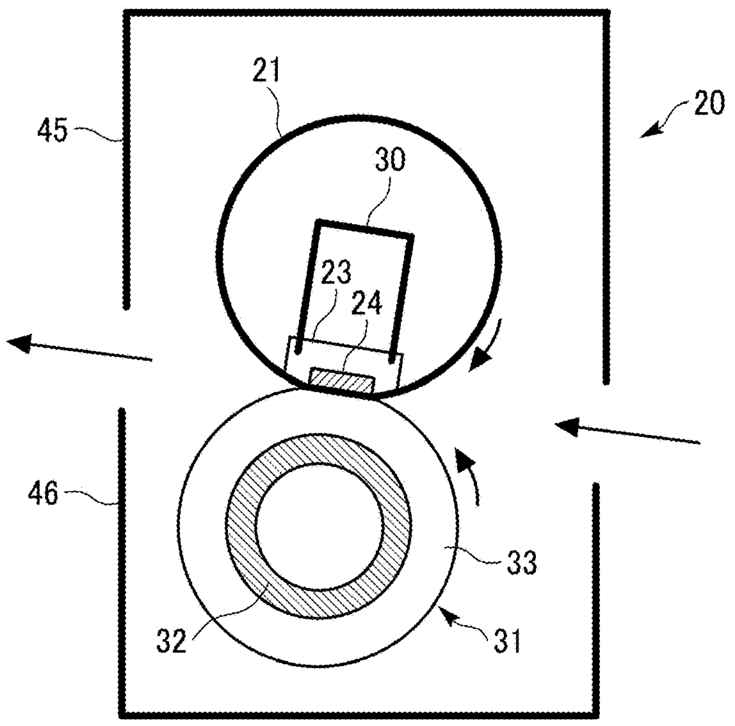
FIG. 2 is a diagram illustrating a configuration of a fixing device incorporated in the image forming apparatus of FIG. 1.
Figure 3:
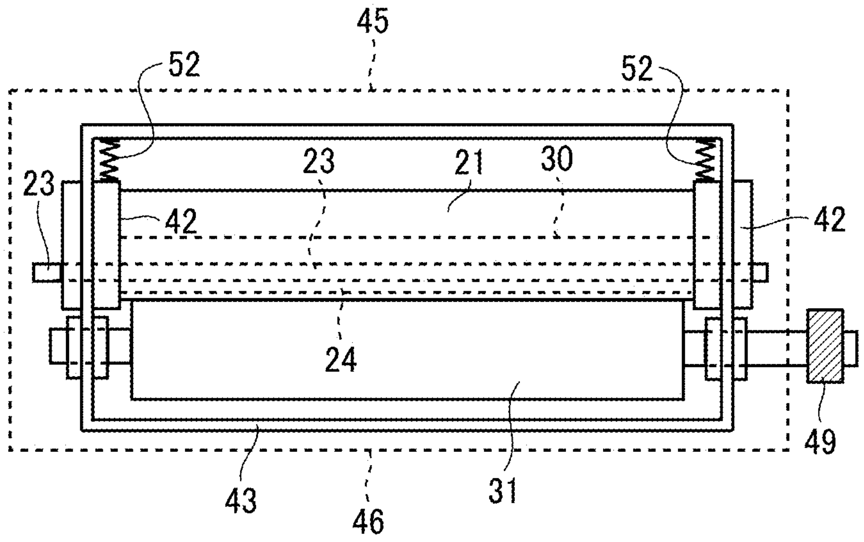
FIG. 3 is a diagram illustrating a configuration of the fixing device of FIG. 2 in a longitudinal direction of the fixing device.
Figure 4:
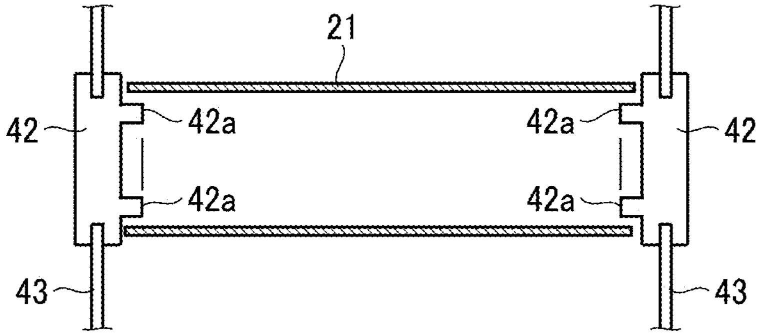
FIG. 4 is a schematic cross-sectional view of a fixing belt and flanges supporting the fixing belt.

Referring to FIGS. 2 to 4, the following describes a configuration and operation of the fixing device 20 incorporated in the image forming apparatus 100 described above. Referring to FIGS. 2 to 4, the fixing device 20 includes the fixing belt 21 as a fixing rotator, a reinforcement 30, a planar heater 24 as a heater, and the pressure roller 31 as a pressure rotator.

The fixing belt 21 as the fixing rotator is an endless belt disposed in contact with an outer circumferential surface of the pressure roller 31 and driven to rotate by rotation of the pressure roller 31. The fixing belt 21 is a thin, flexible endless belt driven to rotate clockwise in FIG. 2, that is, in a rotation direction indicated by an arrow in FIG. 2. The fixing belt 21 includes a base layer having an inner circumferential surface (i.e., a sliding contact surface of the fixing belt 21 sliding over the planar heater 24) and a release layer coating the base layer, which define a total thickness of the fixing belt 21 not greater than 1 mm. The base layer of the fixing belt 21 has a thickness in a range of from 30 μm to 50 μm and is made of metal, such as nickel or stainless steel, or resin such as polyimide. The release layer of the fixing belt 21 has a thickness in a range of from 5 μm to 50 μm and is made of material such as tetrafluoroethylene-perfluoroalkyl vinyl ether copolymer (PFA), polytetrafluoroethylene (PTFE), polyimide, polyether imide, and polyether sulfone (PES). The release layer facilitates separation or peeling-off of toner of the toner image on the sheet P from the fixing belt 21. The fixing belt 21 in the present embodiment includes the base layer and the release layer layered on the base layer but may further include an elastic layer between the base layer and the release layer.

The fixing belt 21 functions as a substantially cylindrical fixing rotator having a hollow portion formed therein. Inside the fixing belt 21 (the hollow portion), electric components (power-supplied members) such as the planar heater 24, a holder 23, and the reinforcement 30 are disposed.

The planar heater 24 contacts the inner circumferential surface of the fixing belt 21. The planar heater 24 is pressed against the pressure roller 31 via the fixing belt 21 to form the fixing nip through which the sheet P is conveyed. The planar heater 24 is disposed inside the loop formed by the fixing belt 21 such that the inner circumferential surface of the fixing belt 21 slides over the planar heater 24. Pressing the planar heater 24 against the pressure roller 31 via the fixing belt 21 forms the fixing nip between the fixing belt 21 and the pressure roller 31, through which the sheet P is conveyed. As described above, the planar heater 24 functions as a nip formation pad that is a member forming the fixing nip. The planar heater 24 may include a surface layer or a sheet made of low friction material such as PTFE on the surface of the planar heater 24 to reduce sliding friction between the fixing belt 21 and the planar heater 24.

In addition, the planar heater 24 includes resistor patterns formed on a portion that is in sliding contact with the inner circumferential surface of the fixing belt 21. A power supply supplies electric power to the planar heater 24 (that is, resistor patterns) via a harness 61 (see FIG. 5), and each of the resistor patterns generates heat according to the resistance of the resistor pattern to heat the fixing belt 21. As described above, the planar heater 24 also functions as a heater to heat the fixing belt 21.

In the present embodiment, the holder 23 holds the planar heater 24. As illustrated in FIG. 3, a frame 43 of the fixing device 20 holds both ends of the holder 23 in a width direction of the holder 23 that is the direction perpendicular to a plane on which FIG. 2 is illustrated and the lateral direction in FIG. 3.

The harness 61 to supply the electric power to the planar heater 24 is described below in detail with reference to the drawings such as FIGS. 5 and 6.

As described above, the planar heater 24 disposed inside the loop of the fixing belt 21 directly heats the fixing belt 21. The outer circumferential surface of the fixing belt 21 heated by the planar heater 24 heats the toner image on the sheet P. Output of the planar heater 24 is controlled based on the temperature of the outer circumferential surface of the fixing belt 21 detected by a temperature sensor. The temperature sensor is a thermopile or a thermistor, disposed opposite the surface of the fixing belt 21. The planar heater 24 controlled as described above heats the fixing belt 21 to a desired fixing temperature.

Instead of the temperature sensor that directly detects the fixing temperature of the fixing belt 21 as described above, the fixing device in the present embodiment may include a temperature sensor that detects the surface temperature of the planar heater 24 to predict (indirectly detect) the fixing temperature (that is the surface temperature) of the fixing belt 21 based on the surface temperature of the planar heater 24 detected by the temperature sensor.

Referring to FIG. 4, a pair of flanges 42 as guides guide ends of the inner circumferential surface of the fixing belt 21 in a width direction of the fixing belt 21 such that the fixing belt 21 maintains a substantially cylindrical posture.

Specifically, the two flanges 42 are made of a heat-resistant resin material and are fitted into both sides of the frame 43 of the fixing device 20 in a width direction of the fixing device 20 that is the same as the longitudinal direction of the fixing device 20, the longitudinal direction of the fixing cover, the axial direction of the pressure roller 31, and the longitudinal direction of the planar heater 24. Each of the flanges 42 includes a guide **42*a* and a stopper. The guide 42*a* supports the fixing belt 21 to maintain the substantially cylindrical posture thereof. The stopper restricts motion or skew of the fixing belt 21** in the width direction thereof.

In addition, as illustrated in FIG. 3, the fixing device 20 according to the present embodiment includes compression springs 52 as biasing members. Biasing force of the compression springs 52 press the flanges 42. As a result, the fixing belt 21, the planar heater 24, and the holder 23 are pressed against the pressure roller 31 by the biasing force.

The flanges 42 are disposed to support both ends of the loop of the fixing belt 21 in the width direction except for portions facing both ends of the fixing nip so that the planar heater 24 can form the fixing nip.

As described above, the inner circumferential surface of the fixing belt 21 is loosely contacted only by the planar heater 24 and the flanges 42 at respective ends of the fixing belt 21 in the width direction thereof. No other component, such as a belt guide, contacts the inner circumferential surface of the fixing belt 21 to guide the fixing belt 21 as it rotates.

The fixing device 20 according to the present embodiment includes the reinforcement 30 that is disposed inside the loop of the fixing belt 21 so as to be in contact with the pressure roller 31 via the holder 23, the planar heater 24, and the fixing belt 21. The reinforcement 30 reinforces the holder 23 and the planar heater 24 forming the fixing nip, enhancing the mechanical strength of the holder 23 and the planar heater 24. The reinforcement is installed in the frame 43 by screw fastening or other fasteners.

The reinforcement 30 receiving the pressure from the pressure roller 31 via the holder 23, the planar heater 24, and the fixing belt 21 prevents a disadvantage that the pressure from the pressure roller 31 largely deforms the planar heater 24 (and the holder 23) at the fixing nip. Preferably, the reinforcement 30 is made of metal having an increased mechanical strength, such as stainless steel or iron, to achieve the above-described function.

The holder 23 may be made of resin or metal. Preferably, the holder 23 is made of resin that has a rigidity to prevent the holder 23 from bending even if the holder 23 receives the pressure from the pressure roller 31, and the resin preferably has heat resistance and thermal insulation. The resin may be liquid crystal polymer (LCP), polyamide imide (PAI), polyether sulfone (PES), polyphenylene sulfide (PPS), polyether nitrile (PEN), and polyether ether ketone (PEEK). In the present embodiment, the holder 23 is made of LCP.

Referring to FIG. 2, the pressure roller 31 as the pressure rotator includes a cored bar 32 (serving as an axial portion) and an elastic layer 33 coating the cored bar 32. The pressure roller 31 is driven and rotated in a predetermined direction that is counterclockwise in FIG. 2 by a drive motor.

The cored bar 32 of the pressure roller 31 has a hollow structure made of metal. The elastic layer 33 of the pressure roller 31 is made of material such as foamable silicone rubber, silicone rubber, or fluoro rubber. A thin release layer made of PFA or PTFE may be provided on the surface of the elastic layer 33. The pressure roller 31 is pressed against the fixing belt 21 to form a desired nip between the fixing belt 21 and the pressure roller 31. As illustrated in FIG. 3, a gear 49 is attached to the pressure roller 31 and engages a driving gear of the drive motor so that the pressure roller 31 is driven and rotated counterclockwise in FIG. 2, that is, a direction indicated by the arrow in FIG. 2. Both ends of the pressure roller 31 in the width direction are rotatably supported by the frame 43 of the fixing device 20 through bearings, respectively. The pressure roller 31 in the present embodiment has a hollow structure but may have a solid structure.

The fixing device 20 configured as described above is covered with fixing covers including a fixing upper cover 45 and a fixing lower cover 46 as an exterior. Specifically, the fixing upper cover 45 functions as the fixing cover covering the fixing belt 21 as the fixing rotator and is formed to cover a part of the fixing device that is the part including the fixing belt 21 with respect to the fixing nip. In contrast, the fixing lower cover 46 is formed to cover a part of the fixing device that is the part including the pressure roller 31 with respect to the fixing nip. As a result, the longitudinal direction of the fixing upper cover 45 and the fixing lower cover 46 is the same as the width direction. The fixing upper cover 45 and the fixing lower cover 46 are molded articles made of heat-resistant resin, which are made by metal molds, and are screwed to the frame 43 via bosses. The fixing device in the present embodiment includes two fixing covers that are the fixing upper cover 45 and the fixing lower cover 46. However, the fixing device may include one fixing cover or three or more fixing covers.

The following briefly describes operations of the fixing device 20 configured as described above during printing.

Turning on a power switch on the body of the image forming apparatus 100 supplies power to the planar heater 24, and the motor starts driving and rotating the pressure roller 31 counterclockwise in FIG. 2, that is, in the direction indicated by the arrow in FIG. 2. Driving and rotating the pressure roller 31, friction between the pressure roller 31 and the fixing belt 21 rotates the fixing belt 21 clockwise in FIG. 2, that is, in the direction indicated by the arrow in FIG. 2.

Thereafter, the sheet P is fed from the sheet feeder 12, and the toner image is transferred onto the sheet P at the position of the transfer roller 9. As a result, the sheet P bears the toner image, but the toner image is not fixed to the sheet P, that is an unfixed image. The sheet P bearing the unfixed image (that is the toner image) is conveyed in a direction indicated by the arrow in FIG. 2 and enters the fixing nip between the fixing belt 21 and the pressure roller 31 pressed against the fixing belt 21.

The toner image T is fixed on the surface of the sheet P under heat from the fixing belt 21 heated by the planar heater 24 and pressure exerted from the planar heater 24 (and the holder 23) and the pressure roller 31 pressed against the planar heater 24 supported by the reinforcement 30. Thereafter, the sheet P sent out from the fixing nip is conveyed in the direction indicated by the arrow in FIG. 2.

The following describes a characteristic configuration and operation of the fixing device 20 (the image forming apparatus 100) according to the present embodiment in detail.

As described above with reference to FIGS. 2 to 4, the fixing device 20 includes the fixing belt 21 as the fixing rotator, the pressure roller 31 as the pressure rotator, the fixing upper cover 45 as the fixing cover, the planar heater 24 as the electric component, and the harness 61 to supply the electric power to the planar heater 24.

The fixing belt 21 functions as the fixing rotator, has a substantially cylindrical shape having the hollow portion inside the cylindrical shape, and is heated by the planar heater 24 as the heater to heat and fix the toner image on the surface of the sheet P. In particular, the fixing belt 21 in the present embodiment does not include the elastic layer to enhance the heating efficiency of the fixing belt 21.

The pressure roller 31 abuts on the fixing belt 21 as the fixing rotator to form the fixing nip through which the sheet P is conveyed and functions as the pressure rotator.

The fixing upper cover 45 functions as the fixing cover to cover the fixing belt 21 as the fixing rotator.

Figure 5:
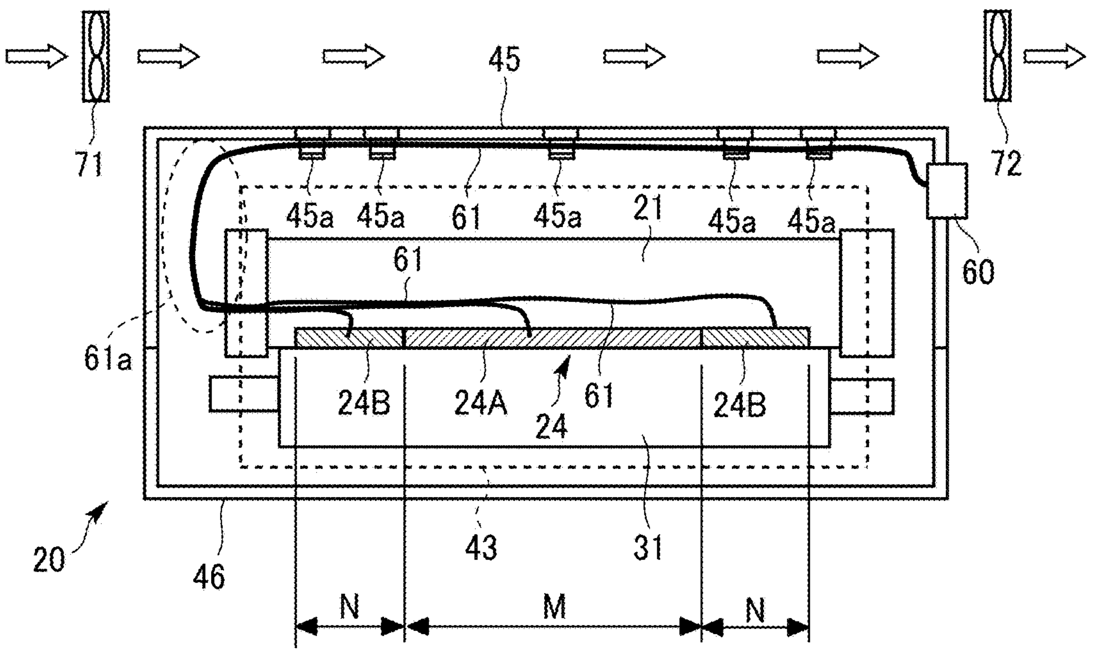
FIG. 5 is a diagram illustrating an arrangement of a harness in a fixing device.
Figure 6:
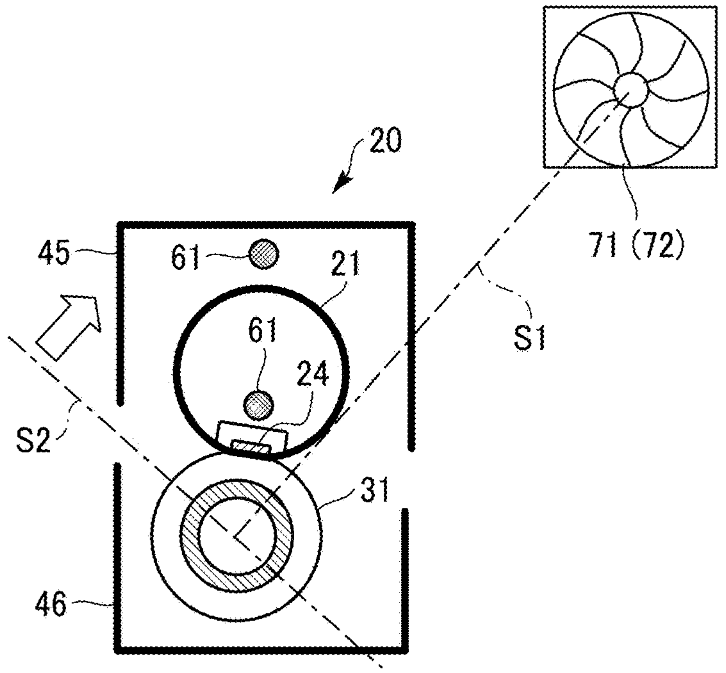
FIG. 6 is a diagram illustrating a positional relationship between a harness of a fixing device and a fan.

Referring to FIGS. 5 and 6, the planar heater 24 is an example of the electric component disposed in the hollow portion of the fixing belt 21 as the fixing rotator and functions as the heater to heat the fixing belt 21. The planar heater 24 in the present embodiment includes tiple heat generators arranged in the width direction that is the same as the longitudinal direction of the planar heater 24, the longitudinal direction of the fixing upper cover 45, the horizontal direction in FIG. 5, and the direction perpendicular to the surface of the paper on which FIG. 6 is drawn.

Specifically, as illustrated in FIG. 5, the planar heater 24 includes a first heat generator 24A disposed at a center region M and second heat generators 24B disposed at both end regions N in the width direction of the planar heater 24 that is the longitudinal direction of the planar heater 24. Since a user inputs sheet data to an operation panel in the image forming apparatus, a controller in the image forming apparatus can determine the size of the sheet P in the width direction based on the input sheet data. In accordance with the size of the sheet P conveyed to the fixing nip, the controller controls electric power supply to the planar heater 24. Specifically, the controller switches between supplying the electric power to all of the first heat generator 24A and the second heat generators 24B and supplying the electric power to the first heat generator 24A in accordance with the size of the sheet P.

The center region M in the width direction substantially corresponds to a minimum sheet passing region through which the sheet P having the smallest width of the sheets that can be conveyed through the fixing nip passes. For example, the sheet having A4 size is often used in Japan. The A4 size is defined as 210 mm×297 mm by Japanese Industrial Standard (JIS). The center region M may corresponds to a sheet passing area through which the sheet P having the width of 210 mm passes. A region (N+M+N) obtained by adding the both end regions N to the center region M substantially corresponds to a maximum sheet passing region through which the sheet P having the largest width of the sheets that can be conveyed through the fixing nip passes. For example, the largest size of the sheet in Japanese offices is often A3 size defined as 297 mm×420 mm by Japanese Industrial Standards. The region (N+M+N) may corresponds to a sheet passing area through which the sheet P having the width of 297 mm passes.

The number of the heat generators of the planar heater 24 in the present embodiment is three but is not limited to this.

Referring to FIGS. 5 and 6, the harness 61 is electrically connected to the planar heater 24 as the electric component (the power-supplied member) to supply the electric power from a power source disposed in the body of the image forming apparatus 100 to the planar heater 24. As illustrated in FIG. 5, the harness 61 is connected to the planar heater 24 as the electric component disposed in the hollow portion of the fixing belt 21. A portion at which the harness 61 is connected to the planar heater 24 as the electric component is referred to as a connection portion below. The harness 61 extends from the connection portion toward one end of the fixing upper cover 45 (that is the left side of the fixing upper cover 45 in FIG. 5) in the width direction. The harness 61 extends to the outside of the fixing belt 21 as the fixing rotator. Outside the fixing belt 21, the harness 61 folds back and extends in the width direction toward the other end of the fixing upper cover 45 (that is the right side of the fixing upper cover 45 in FIG. 5) through a route inside the fixing upper cover 45 between the fixing belt 21 and an inner face of the fixing upper cover 45 as the fixing cover.

Specifically, the harness 61 in the present embodiment is formed by bundling three sub-harnesses, and the distal end portion of the harness 61 is branched into the three subharnesses inside the fixing belt 21 (inside the hollow portion). The three sub-harnesses are connected to the three heat generators that are the first heat generator 24A and the second heat generators 24B, respectively.

The harness 61 extends in the width direction from the inside of the fixing belt 21 toward the one end of the fixing upper cover 45 that is the left side of the fixing upper cover 45 in FIG. 5 to come out of the fixing belt 21. Outside the fixing belt 21, the harness 61 forms a folded portion 61*a*. The harness 61 extends in the width direction through a route between the fixing belt 21 (the frame 43) and the inner face of the fixing upper cover 45 from the folded portion 61*a* toward the other end of the fixing upper cover 45 that is the right side of the fixing upper cover 45 in FIG. 5. The harness 61 is electrically connected to a connector 60 on a side face of the fixing device 20 at the other end of the fixing device 20 in the width direction.

The connector 60 is connected to and disconnected from a body side connector that is electrically connected to the power source in the image forming apparatus 100 in conjunction with the mounting and dismounting operation of the fixing device 20 with respect to the image forming apparatus 100.

The above-described configuration enables the planar heater 24 in the fixing device 20 installed in the image forming apparatus 100 to receive the electric power from the power source in the body of the image forming apparatus 100.

As described above, the harness 61 in the fixing device 20 according to the present embodiment is not routed in the shortest path from the connection portion at which the harness 61 is connected to the planar heater 24 inside the loop of the fixing belt 21 toward the other end of the fixing upper cover 45 in the width direction that is the right side of the fixing upper cover 45 in FIG. 5 on which the connector 60 is disposed. The harness 61 is arranged to detour from the connection portion at which the harness 61 is connected to the planar heater 24 inside the loop of the fixing belt 21 toward the one end of the fixing upper cover 45 in the width direction that is the left side of the fixing upper cover 45 in FIG. 5 and folds back toward the other end of the fixing upper cover 45 through the route between the fixing upper cover 45 and the fixing belt 21.

The above-described structure is less likely to cause the disadvantage that is an excessive temperature rise of the harness 61 connected to the planar heater 24 inside the loop of the fixing belt 21 than the structure in which the harness 61 is routed in the shortest path.

The inside of the fixing belt 21 is likely to retain the heat of the fixing belt 21 itself, and the temperature thereof is higher than that of the other portions. As a result, the portion of the harness 61 arranged inside the loop of the fixing belt 21 is likely to reach a high temperature. The harness 61 is likely to be thermally damaged or reduce the function to supply the electric power to the planar heater 24. In contrast, the harness 61 in the present embodiment is routed in a circuitous manner through the route between the fixing belt 21 and the fixing upper cover 45. The temperature in the route between the fixing belt 21 and the fixing upper cover 45 is lower than the temperature inside the loop of the fixing belt 21. As a result, heat in a high temperature portion of the harness 61 inside the loop of the fixing belt 21 transfers to a low temperature portion of the harness 61 outside the fixing belt 21 through the harness 61. The excessive temperature rise of the harness 61 inside the loop of the fixing belt 21 is reduced.

In view of such a mechanism, the portion of the harness 61 that is arranged outside the fixing belt 21 between the fixing belt 21 and the fixing upper cover 45 is preferably disposed at a position as far as possible from the fixing belt 21 having the high temperature.

In particular, the fixing belt 21 in the present embodiment does not include an elastic layer, and the adhesion of the fixing belt 21 to the toner is inferior to the adhesion of a fixing belt including the elastic layer between the base layer and the release layer. To satisfactorily fix the toner image, the fixing temperature is set to be high. Since the temperature of the harness 61 is likely to rise, the configuration of the harness 61 according to the present embodiment is useful.

The planar heater 24 in the present embodiment includes multiple heat generators arranged in the width direction. In order to connect the harness 61 to at least the first heat generator 24A disposed at the center region M in the width direction, the connection portion is disposed at the center region M. The connection portion for the first heat generator 24A cannot be disposed at the end region in the width direction. The central space inside the loop of the fixing belt 21 in the width direction is most likely to store heat. The temperature of the connection portion at least in the central space in the width direction is likely to rise. The configuration of the harness 61 according to the present embodiment is useful.

Referring to FIGS. 5 and 6, the fixing upper cover 45 as the fixing cover in the present embodiment is disposed so that an airflow indicated by white arrows in FIG. 5 outside the fixing device 20 can cool the fixing upper cover 45. Specifically, referring to FIGS. 1, 5, and 6, a suction fan 71 and an exhaust fan 72 are disposed in the body of the image forming apparatus 100. The suction fan 71 takes air from the outside (the front side) of the image forming apparatus 100 into the inside of the image forming apparatus 100 to cool the inside of the image forming apparatus 100. The exhaust fan 72 discharges hot air inside the image forming apparatus 100 to the outside (the rear side) of the image forming apparatus 100. The suction fan 71 and the exhaust fan 72 function as a fan to generate the airflow outside the fixing device 20. Specifically, the air sucked by the suction fan 71 flows to be blown on the surface of the fixing upper cover 45. The exhaust fan 72 actively exhausts the air flowing as described above to the outside of the image forming apparatus 100.

The above-described configuration actively cools a portion of the harness 61 arranged between the fixing belt 21 and the fixing upper cover 45 via the fixing upper cover 45. As a result, the heat in the high temperature portion of the harness 61 inside the loop of the fixing belt 21 easily transfers to the above-described portion of the harness 61 through the harness 61. The excessive temperature rise of the harness 61 in the fixing belt 21 is further reduced.

FIG. 6 is a diagram illustrating a positional relation between the harness 61 and the fans in an imaginary X-Y coordinate system viewed from the front side of the image forming apparatus. Since the suction fan 71 faces the exhaust fan 72 as illustrated in FIG. 5, the suction fan 71 overlays on the exhaust fan 72 in FIG. 6. The suction fan 71 greatly contribute to the cooling of the fixing upper cover 45. As illustrated in FIG. 6, the suction fan 71 and the exhaust fan 72 are disposed above the fixing upper cover 45 as the fixing cover in the imaginary X-Y coordinate system. FIG. 6 illustrates an imaginary straight line S1 and an imaginary straight line S2. The imaginary straight line S1 connects the center of the suction fan 71 as the fan and the rotation center of the pressure roller 31. The imaginary straight line S2 is orthogonal to the imaginary straight line S1 and passes through the rotation center of the pressure roller 31. In the X-Y coordinate system, the harness 61 is disposed in a region from the imaginary straight line S2 toward the suction fan 71 in the direction indicated by a white arrow in FIG. 6. In other words, the harness 61 is in a region, where the suction fan 71 is disposed, divided from another region by the imaginary line S2.

The fixing upper cover 45 cooled by the suction fan 71 is in the region defined by the above-described positional relation, and the harness 61 arranged between the fixing belt 21 and the fixing upper cover 45 is disposed in the region. Accordingly, the above-described effect preventing the excessive temperature rise in the harness 61 is likely to be exhibited.

As illustrated in FIG. 5, the suction fan 71 as the fan in the present embodiment is disposed so as to generate the airflow from the one end of the fixing upper cover 45 in the width direction (that is the left side of the fixing upper cover 45 in FIG. 5) toward the other end of the fixing upper cover 45 in the width direction (that is the right side of the fixing upper cover 45 in FIG. 5). The suction fan 71 is disposed to be closer to the folded portion 61*a* than to the connector 60 and enhance the performance to cool the folded portion 61*a*. Heat in the portion of the harness 61 that has reached a high temperature inside the loop of the fixing belt 21 is transmitted through the folded portion 61*a* and reaches the portion between the fixing belt 21 and the fixing upper cover 45. The suction fan 71 actively cools the folded portion 61*a* to enhance the effect of preventing the excessive temperature rise of the harness 61 described above.

Referring to FIG. 5, multiple ribs 45*a* (in the example of FIG. 5, five ribs 45*a*) are arranged in the width direction at intervals on the fixing upper cover 45 as the fixing cover in the present embodiment to hold the harness 61 between the fixing belt 21 as the fixing rotator and the fixing upper cover 45. Specifically, each of the multiple ribs 45*a* in the present embodiment has a substantially V-shape bent and projected from the inner top surface of the fixing upper cover 45 downward. The bent portion of the rib 45*a* holds the harness 61 along the top surface. The ribs 45*a* disposed as described above maintain the posture of the harness 61 between the fixing belt 21 and the fixing upper cover 45, which helps easily and stably exhibiting the effect of preventing the excessive temperature rise of the harness 61 described above.

In particular, bringing the portion of the harness 61 disposed outside the fixing belt 21 between the fixing belt 21 and the fixing upper cover 45 into contact with the fixing upper cover 45 directly cooled by the suction fan 71 increases the cooling efficiency of the portion and more easily exhibits the effect of preventing the excessive temperature rise of the harness 61.

The fixing upper cover 45 in the present embodiment is manufactured by resin molding. To manufacture the ribs 45*a* on the top portion (the top surface) of the fixing upper cover 45 by resin molding, the fixing upper cover 45 has holes to form the ribs 45*a*. The above-described holes in the fixing upper cover 45 may allow a small amount of air to flow from the outside of the fixing device to the inside of the fixing device and may hinder the efficiency to heat the fixing belt 21. The heating efficiency of the first heat generator 24A disposed at the center region M in the width direction to heat the fixing belt 21 tends to be lower than the heating efficiency of the second heat generator 24B disposed at the end region N in the width direction to heat the fixing belt 21.

Considering the above, the number of ribs 45*a* disposed on the center region of the top surface of the fixing upper cover 45 in the width direction is designed to be smaller than the number of ribs 45*a* disposed on the end region of the top surface of the fixing upper cover 45 in the width direction. In the example of FIG. 5, the number of ribs 45*a* facing the center range M in the width direction is one, and the number of ribs 45*a* facing each of the end regions N in the width direction is two.

The following describes a first modification of the present embodiment.

Figure 7:
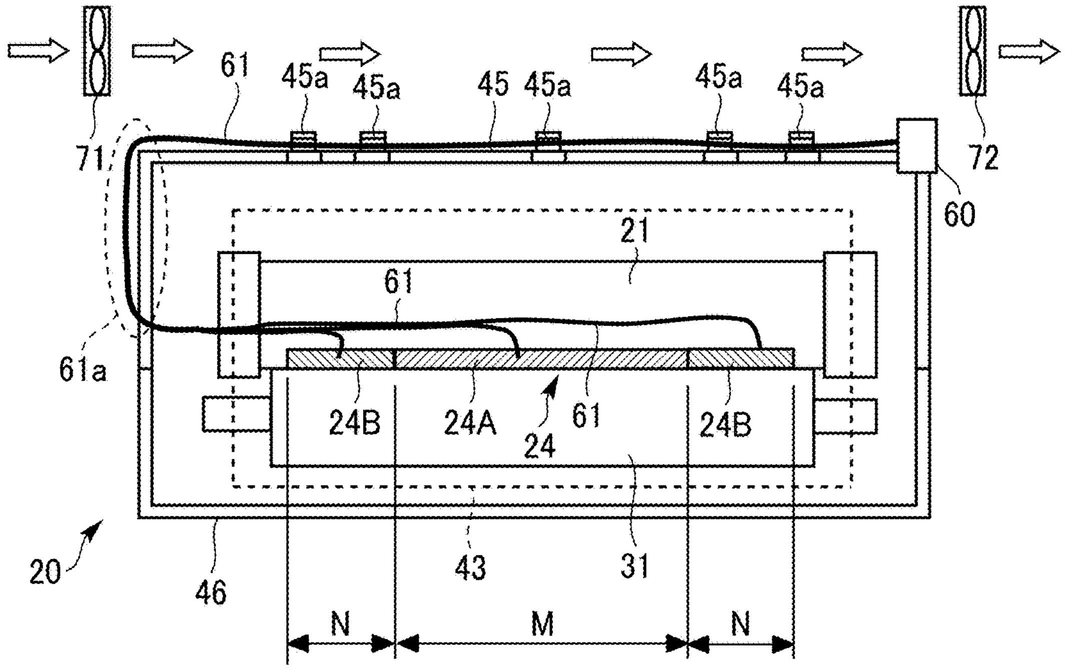
FIG. 7 is a diagram illustrating an arrangement of a harness in a fixing device according to a first modification.
Figure 8:
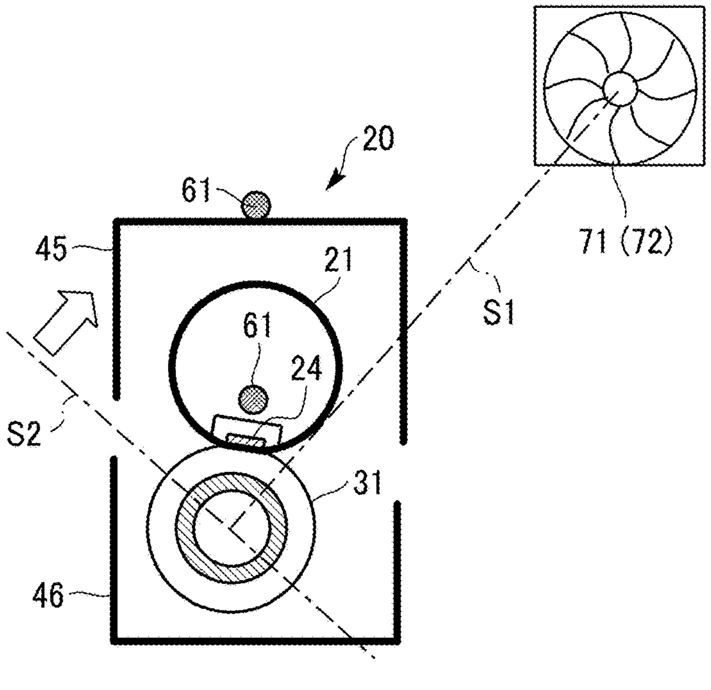
FIG. 8 is a diagram illustrating a positional relationship between a harness of the fixing device of FIG. 7 and a fan.

As illustrated in FIGS. 7 and 8, the harness 61 in the fixing device 20 according to the first modification is arranged on the outer surface of the fixing upper cover 45, which is different from the fixing device 20 including the harness 61 disposed between the fixing upper cover 45 and the fixing belt 21 as illustrated in FIGS. 5 and 6.

As illustrated in FIG. 7, the harness 61 is connected to the planar heater 24 as the electric component disposed in the hollow portion of the fixing belt 21. The harness 61 extends from the connection portion at which the harness 61 is connected to the planar heater 24 toward the one end of the fixing upper cover 45 (that is the left side of the fixing upper cover 45 in FIG. 7) outside the fixing belt 21 as the fixing rotator and the fixing device in the width direction. Outside the fixing device, the harness 61 folds back and extends in the width direction toward the other end of the fixing upper cover 45 (that is the right side of the fixing upper cover 45 in FIG. 7) through the route outside the fixing upper cover 45.

The fixing upper cover 45 has multiple ribs 45*a* arranged at intervals on the outer surface of the fixing upper cover 45 in the width direction to hold the harness 61.

The above-described configuration of the fixing device 20 is also less likely to cause the excessive temperature rise in the harness 61 connected to the planar heater 24 as the electric component inside the loop of the fixing belt 21 as the fixing rotator. In particular, in the fixing device 20 according to the first modification, the airflow generated by the suction fan 71 as the fan directly cools the portion of the harness 61 arranged on the outer surface of the fixing upper cover 45, and thus the above-described effect is more remarkably exhibited.

The following describes a second modification of the present embodiment.

Figure 9:
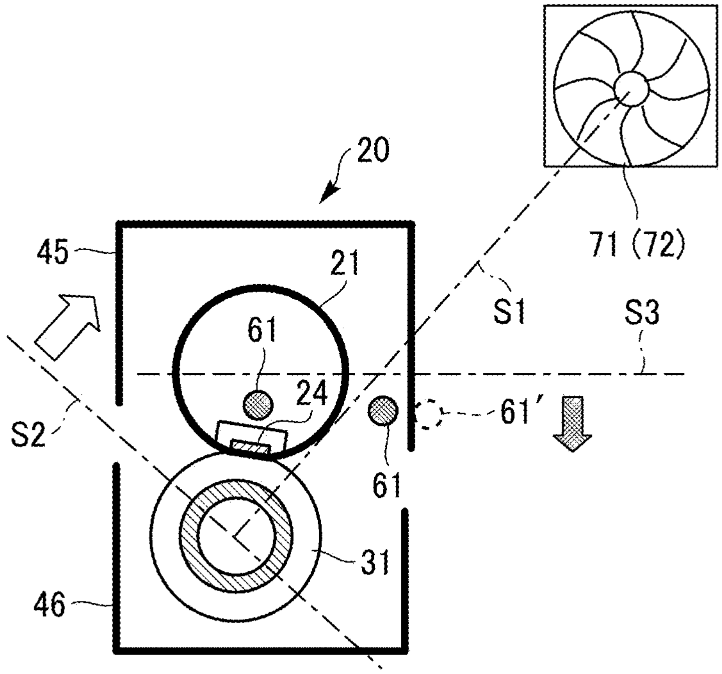
FIG. 9 is a diagram illustrating a positional relationship between a harness of a fixing device according to a second modification and a fan.

Similar to FIG. 6, FIG. 9 is a diagram illustrating a positional relation between the harness 61 and the fans according to the second modification in the imaginary X-Y coordinate system viewed from the front side of the image forming apparatus. In the imaginary X-Y coordinate system, the harness 61 is disposed in the region from the imaginary straight line S2 toward the suction fan 71 in the direction indicated by the white arrow in FIG. 9. In the fixing device 20 according to the second modification, the harness 61 is disposed at a position lower than an imaginary horizontal line S3 passing through the center of the fixing belt 21 in the vertical direction of FIG. 9.

The high-temperature air rises inside the fixing upper cover 45. This means that the temperature of the harness 61 is less likely to rise as the harness 61 is disposed at a lower position between the fixing belt 21 and the fixing upper cover 45. The configuration illustrated in FIG. 9 is likely to exhibit the effect of preventing the temperature of the harness 61 from excessively rising.

As in the first modification, the fixing device 20 in the second modification may include the harness 61' illustrated by a circle drawn by a broken line in FIG. 9 and arranged to pass through a route outside the fixing upper cover 45, not between the fixing upper cover 45 and the fixing belt 21.

The following describes a third modification.

Figure 10:
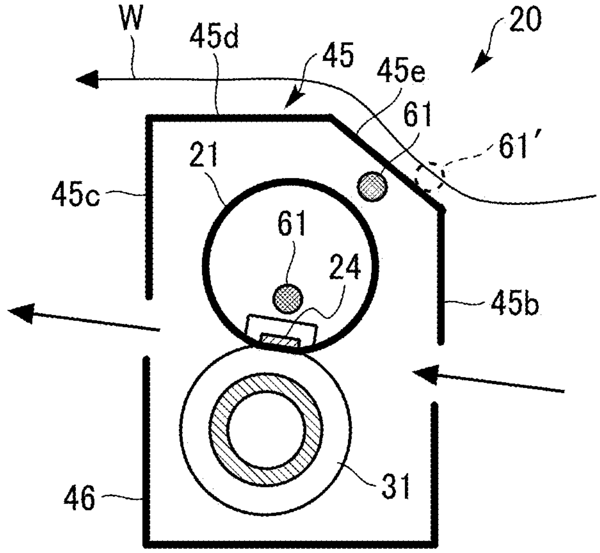
FIG. 10 is a diagram illustrating a positional relationship between a harness of a fixing device according to a third modification and a fan.

As illustrated in FIG. 10, the fixing upper cover 45 as the fixing cover in the fixing device 20 according to the third modification has an entrance side plate 45*b*, an exit side plate 45*c*, a top plate 45*d*, and an inclined plate 45*e*.

The entrance side plate 45*b* is close to the entrance of the fixing nip and extends in the vertical direction in FIG. 10 so as to face the fixing belt 21 as the fixing rotator. In other words, the entrance side plate 45*b* faces one side of the fixing belt upstream from the entrance of the fixing nip in a rotation direction of the fixing belt as the fixing rotator.

The exit side plate 45*c* is close to the exit of the fixing nip and extends in the vertical direction so as to face the fixing belt 21. In other words, the exit side plate faces another side of the fixing belt downstream from the exit of the fixing nip in the rotation direction.

The top plate 45*d* extends in the substantially horizontal direction in FIG. 10 so as to face the upper part of the fixing belt 21.

The inclined plate 45*e* is inclined obliquely upward in a direction from the entrance of the fixing nip toward the exit of the fixing nip to connect the upper end of the entrance side plate 45*b* and the one end of the top plate 45*d* that is closer to the entrance of the fixing nip than the other end of the top plate 45*d*.

The other end of the top plate 45*d* is connected to the upper end of the exit side plate 45*c*.

The harness 61 is arranged to fold back at a position between the one end of the fixing upper cover 45 in the width direction and the fixing belt 21 and extend toward the other end of the fixing upper cover 45 in the width direction through a route between the fixing belt 21 and the inclined plate 45*e* of the fixing upper cover 45. In other words, outside the fixing belt 21, the harness 61 is arranged between the fixing belt 21 and the inclined plate 45*e* of the fixing upper cover 45.

In the fixing device 20, water vapor is generated from the sheet P, and wax is volatilized from the toner image on the sheet P. The water vapor and the volatilized wax flow to a space above the fixing device 20. Desirably, the water vapor and the volatilized wax is discharged to the outside of the image forming apparatus as much as possible. To discharge the water vapor and the volatilized wax, an airflow generator such as a fan is disposed to generate an airflow from a space upstream from the fixing device toward a space downstream from the fixing device in a sheet conveyance direction (that is from the right side to the left side in FIG. 10). If the upper end of the entrance side plate 45*b* is directly connected to the one end of the top plate 45*d* that is closer to the entrance of the fixing nip than the other end of the top plate 45*d*, the above-described airflow is not smoothly formed. The entrance side plate 45*b* blocks the above-described airflow, and the airflow is less likely to be exposed to the top plate 45*d*, reducing the cooling effect of the airflow to cool the top plate 45*d*.

In contrast, the fixing device according to the third modification illustrated in FIG. 10 includes the inclined plate 45*e* connecting the upper end of the entrance side plate 45*b* and the one end of the top plate 45*d* to form a smooth airflow Was illustrated in FIG. 10. The smooth airflow W, in particular, enhances the cooling effect to cool the inclined plate 45*e*. Arranging the harness 61 at the above-described position is likely to exhibit the effect of preventing the temperature of the harness 61 from excessively rising.

As in the first modification, the fixing device 20 in the third modification may include the harness 61' illustrated by a circle drawn by a broken line in FIG. 10 and arranged to pass a route outside the inclined plate 45*e* of the fixing upper cover 45, not between the fixing upper cover 45 and the fixing belt 21.

The following describes a fourth modification.

Figure 11:
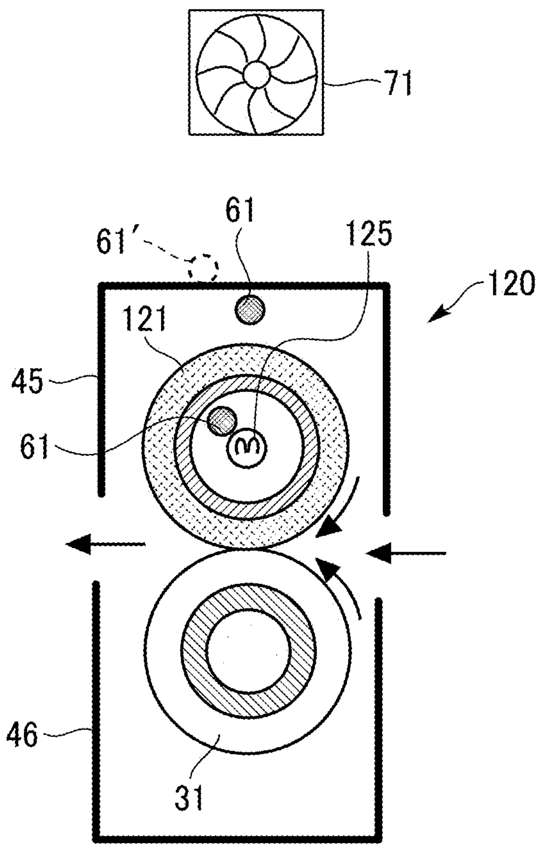
FIG. 11 is a diagram illustrating a fixing device according to a fourth modification.

As illustrated in FIG. 11, a fixing device 120 in the fourth modification is a heater roller type fixing device and includes a fixing roller 121 as the fixing rotator and a halogen heater 125 as the heater.

Specifically, the fixing roller 121 as the fixing rotator has a multilayer structure and includes a cored bar having a hollow structure and made of metal such as stainless steel and a coating layer including an elastic layer and a release layer that are laminated on the cored bar. The fixing roller 121 as the fixing rotator is pressed against the pressure roller 31 as the pressure rotator to form the fixing nip.

The elastic layer of the coating layer of the fixing roller 121 is made of elastic material such as fluoro rubber, silicone rubber, or silicone rubber foam. The release layer of the coating layer of the fixing roller 121 is made of, for example, perfluoroalkoxy alkane (PFA).

The halogen heater 125 as the heater serving as the electric component is fixed inside the loop of the fixing roller 121 that is the hollow portion. The harness 61 is connected to the halogen heater 125 as the electric component to supply the electric power to the halogen heater 125.

The harness 61 extends in the width direction from the inside of the fixing roller 121 as the fixing rotator toward the one end of the fixing upper cover 45 that is the front side of the fixing upper cover 45 in FIG. 11 in a direction perpendicular to the surface of the paper on which FIG. 11 is drawn to come out of the fixing roller 121. Outside the fixing roller 121, the harness 61 forms the folded portion 61*a*. From the folded portion 61*a*, the harness 61 extends in the width direction through a route inside the fixing upper cover 45 between the fixing roller 121 and the inner face of the fixing upper cover 45 toward the other end of the fixing upper cover 45 that is the rear side of the fixing upper cover 45 in the direction perpendicular to the paper on which FIG. 11 is drawn. The harness 61 is electrically connected to the connector 60 on the side face of the fixing device 20 at the other end of the fixing device 20 in the width direction.

The fixing device 120 configured as described above operates as follows.

When the image forming apparatus 1 is powered on, an alternate current (AC) voltage is applied from the power source in the body of the image forming apparatus 100 to the halogen heater 125 via the harness 61.

In response to a print command (a print request) input, a drive motor as a drive mechanism starts rotating the fixing roller 121 clockwise in FIG. 11, and the pressure roller 31 starts rotating counterclockwise in FIG. 11 in accordance with the clockwise rotation of the fixing roller 121. Thereafter, the sheet P is fed from the sheet feeder 12, and the toner image is transferred from the photoconductor drum 1 onto the sheet P at the position of the transfer roller 9. As a result, the sheet P bears the toner image, but the toner image is not fixed to the sheet P, that is an unfixed image. The sheet P bearing the unfixed image (that is the toner image) is conveyed in a direction indicated by the arrow in FIG. 11 and enters the fixing nip between the fixing roller 121 and the pressure roller 31 pressed against the fixing roller 121. The toner image is fixed onto a surface of the sheet P under heat from the fixing roller 121 and pressure exerted from the fixing roller 121 and the pressure roller 31. Thereafter, the sheet P, on which the toner image T is fixed, is conveyed from the fixing nip in the direction indicated by an arrow in FIG. 11 according to the rotation of the fixing roller 121 and the pressure roller 31.

The above-described configuration of the fixing device 120 is also less likely to cause the excessive temperature rise in the harness 61 connected to the halogen heater 125 as the electric component inside the fixing roller 121 as the fixing rotator.

The fixing device 120 in the fourth modification may also include the harness 61' illustrated by a circle drawn by a broken line in FIG. 11 and arranged to pass through a route outside the fixing upper cover 45, not between the fixing upper cover 45 and the fixing roller 121.

The following describes a fifth modification.

Figure 12:
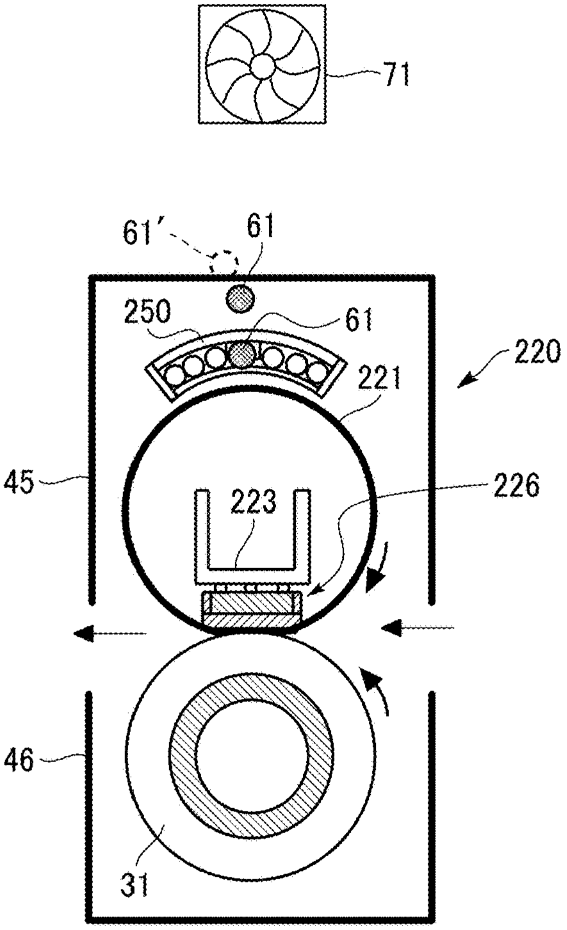
FIG. 12 is a diagram illustrating a fixing device according to a fifth modification.

As illustrated in FIG. 12, a fixing device 220 in the fifth modification is an induction heating (IH) type fixing device and includes an electromagnetic induction coil 250 as the heater.

Specifically, the electromagnetic induction coil 250 as the heater is the electric component installed to face the outer circumferential surface of a fixing belt 221 as the fixing rotator and is connected to the harness 61. The electromagnetic induction coil 250 includes a litz wire, which is a bundle of thin wires, extending in the width direction so as to cover a part of the fixing belt 221 and integrally formed with a core and a coil guide.

The coil guide is made of resin having high heat resistance and holds the core and the electromagnetic induction coil 250. The core is a semi-cylindrical member made of ferromagnetic material (having a relative magnetic permeability of about 1000 to 3000) such as ferrite. A center core and a side core are disposed to form an efficient magnetic flux toward the fixing belt 221. The core is disposed so as to face the electromagnetic induction coil 250 extending in the width direction.

The fixing belt 221 includes a heat generating layer in addition to the base layer, the elastic layer, and the release layer. The electromagnetic induction coil 250 generates heat in the heat generation layer due to electromagnetic induction. For example, the heat generation layer may be formed between the elastic layer and the release layer, or the base layer may be used as the heat generation layer. As the material of the heat generation layer, nickel, stainless steel, iron, copper, cobalt, chromium, aluminum, gold, platinum, silver, tin, palladium, or an alloy of some of these metals can be used.

Inside the loop of the fixing belt 221, the fixing device 220 includes a nip formation pad 226 pressed against the pressure roller 31 via the fixing belt 221 to form the fixing nip and a reinforcement 223 to reinforce the strength of the nip formation pad 226.

The fixing device 220 configured as described above operates as follows.

When the fixing belt 221 rotates clockwise in the direction indicated by the arrow in FIG. 12, the fixing belt 221 is heated at a position facing the electromagnetic induction coil 250. Specifically, flowing a high-frequency alternating current through the electromagnetic induction coil 250 forms magnetic lines of force around the fixing belt 221 so as to be alternately switched in both directions. At this time, an eddy current is generated in the surface of the heat generation layer of the fixing belt 221, and the eddy current and the electrical resistance of the heat generation layer itself generate Joule heat. The Joule heat generated by the electromagnetic induction heating heats the heat generation layer and heats the fixing belt 221.

The fixing upper cover 45 as the fixing cover covers the electromagnetic induction coil 250 as the electric component together with the fixing belt 221 as the fixing rotator. In other words, the electromagnetic induction coil 250 is disposed between the fixing belt 221 and the fixing upper cover 45.

The harness 61 is connected to the electromagnetic induction coil 250 as the electric component between the fixing belt 221 as the fixing rotator and the fixing upper cover 45 as the fixing cover. The harness 61 is arranged to extend from a connection portion at which the harness 61 is connected to the electromagnetic induction coil 250 toward one end of the fixing upper cover 45 outside the fixing belt 221, and fold back and extend toward the other end of the fixing upper cover 45 in the width direction through a route inside the fixing upper cover 45 between the electromagnetic induction coil 250 and the inner face of the fixing upper cover 45.

In order to configure the electromagnetic induction coil 250 to be relatively detachable as a unit, the fixing upper cover 45 in the fixing device 220 may be separated as parts that are a cover covering the electromagnetic induction coil 250 and a cover covering the fixing belt 221.

The fixing upper cover 45 in the fifth modification is disposed so as to be cooled by an airflow outside the fixing device 220. As in the embodiment illustrated in FIG. 5, the fixing upper cover 45 is cooled by the suction fan 71 (or the exhaust fan 72).

Thus, the temperature of the harness 61 connected to the electromagnetic induction coil 250 as the electric component between the fixing belt 221 and the fixing upper cover 45 (in the example of FIG. 12, inside the case of the electromagnetic induction coil 250) is less likely to excessively rise. The temperature of the electromagnetic induction coil 250 itself is likely to rise excessively, and the temperature in the coil case is likely to reach a high temperature. Accordingly, arranging the harness 61 as described above is useful.

The fixing device 220 in the fifth modification may include the harness 61' illustrated by a circle drawn by a broken line in FIG. 12 and arranged to pass through a route outside the fixing upper cover 45, not between the fixing upper cover 45 and the electromagnetic induction coil 250.

The following describes a sixth modification.

Figure 13:
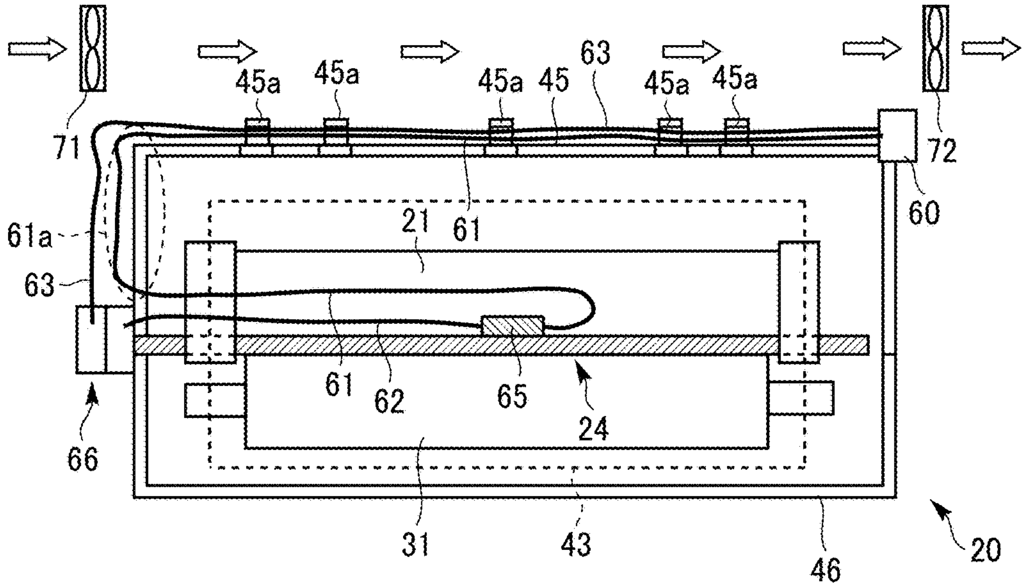
FIG. 13 is a diagram illustrating a fixing device according to a sixth modification.

As illustrated in FIG. 13, the fixing device 20 according to the six modification includes a power supply connector 66 into which the planar heater 24 is directly inserted so that the resister pattern of the planar heater 24 contacts terminals of the connector 66. The planar heater 24 illustrated in FIG. 13 is one heater extending in the width direction.

The power supply connector 66 is fixed to the fixing upper cover 45 and electrically connected to the connector 60 via a harness 63. Thus, electric power is supplied from the power source in the body of the image forming apparatus 100 to the planar heater 24 via the connector 60, the harness 63, and the power supply connector 66.

On the other hand, a thermostat 65 as the electric component is in the hollow portion of the fixing belt 21. The thermostat 65 contacts the planar heater 24 and functions as a safety device to prevent an excessive temperature rise of the planar heater 24. One end of the thermostat 65 is connected to the connector 60 via a first harness 61, and the other end of the thermostat 65 is connected to the power supply connector 66 via a second harness 62. Electrically connecting the power source in the body of the image forming apparatus 100 to the connector 60 forms an electric circuit including the thermostat 65.

The harness 61 as the first harness is connected to the thermostat 65 as the electric component disposed in the hollow portion of the fixing belt 21. The harness 61 extends from a connection portion at which the harness 61 is connected to the thermostat 65 toward the one end of the fixing upper cover 45 (that is the left side of the fixing upper cover 45 in FIG. 13) outside the fixing belt 21 as the fixing rotator and the fixing device in the width direction. Outside the fixing device, the harness 61 folds back and extends in the width direction toward the other end of the fixing upper cover 45 (that is the right side of the fixing upper cover 45 in FIG. 13) through the route outside the fixing upper cover 45 as the fixing cover.

The above-described configuration of the fixing device 20 is also less likely to cause the excessive temperature rise in the harness 61 connected to the thermostat 65 as the electric component inside the loop of the fixing belt 21 as the fixing rotator.

As described above, the fixing device 20 according to the present embodiment includes the planar heater 24 as the heater, the fixing belt 21 as the fixing rotator, the pressure roller 31 as the pressure rotator, the harness 61, and the fixing upper cover 45 as the fixing cover. The planar heater 24 heats the fixing belt 21. The fixing belt 21 heated by the planar heater 24 heats the toner image to fix the toner image onto the surface of the sheet P. The fixing belt 21 has the cylindrical shape having the hollow portion inside the cylindrical shape. The pressure roller 31 contacts the fixing belt 21 to form the fixing nip through which the sheet P is conveyed. The planar heater 24 is disposed inside the hollow portion of the fixing belt 21. The harness 61 is connected to the planar heater 24. The fixing upper cover 45 covers the fixing belt 21. The harness 61 is connected to the planar heater 24 disposed in the hollow portion of the fixing belt 21. The harness 61 extends from the connection portion at which the harness 61 is connected to the planar heater 24 toward the one end of the fixing upper cover 45 outside the fixing belt 21 in the width direction. The harness 61 comes out of the fixing belt 21. Outside the fixing belt 21, the harness 61 folds back and extends in the width direction toward the other end of the fixing upper cover 45 through the route inside the fixing upper cover 45 between the fixing belt 21 and the inner face of the fixing upper cover 45 (or the route outside the fixing upper cover 45).

The above-described configuration of the fixing device 20 is less likely to cause the excessive temperature rise in the harness 61 connected to the planar heater 24 as the electric component inside the loop of the fixing belt 21 as the fixing rotator.

In the present embodiment and modifications described above, the pressure roller 31 is used as the pressure rotator, but the pressure rotator is not limited to this. Alternatively, a pressure belt may be used as the pressure rotator.

In the present embodiment and modifications described above, the electric component is the heater to heat the fixing rotator, such as the planar heater 24 connected to the harness 61, but the present disclosure may be applied to an electric component different from the heater.

Such cases also provide substantially the same effects as the effects described above.

Note that embodiments and modifications of the present disclosure are not limited to the above, and it is apparent that the above-described embodiments and modifications can be appropriately modified within the scope of the technical idea of the present disclosure in addition to what is suggested in the above-described embodiments and modifications. The number, position, and shape of the components described above are not limited to those embodiments described above. Desirable number, position, and shape can be determined to perform the present disclosure.

In the present description, the term "sheet" is defined as any sheet-like recording medium, such as general paper, coated paper, label paper, overhead projector (OHP) transparency, or a film sheet.

Note that aspects of the present disclosure may be applicable to, for example, combinations of first to thirteenth aspects as follows.

First Aspect

In a first aspect, a fixing device includes a fixing rotator, a fixing cover, a pressure rotator, an electric component, and a harness. The fixing rotator has a hollow portion inside the fixing rotator. The fixing cover covers the fixing rotator and extends from one end to another end in a longitudinal direction of the fixing cover. The pressure rotator contacts the fixing rotator to form a fixing nip. The electric component is disposed inside the hollow portion of the fixing rotator. The harness is connected to the electric component at a connection portion. The harness extends from the connection portion toward one end of the fixing cover outside the fixing rotator in the longitudinal direction, and folds back and extends toward said another end of the fixing cover in the longitudinal direction through one of a route inside the fixing cover between the fixing rotator and an inner face of the fixing cover and a route outside the fixing cover.

Second Aspect

In a second aspect, a fixing device a fixing rotator, a fixing cover, a pressure rotator, an electric component, and a harness. The fixing cover covers the fixing rotator and extends from one end to another end in a longitudinal direction of the fixing cover. The pressure rotator contacts the fixing rotator to form a fixing nip. The electric component is disposed between the fixing rotator and the fixing cover. The harness is connected to the electric component at a connection portion. The harness extends from the connection portion toward one end of the fixing cover outside the fixing rotator in the longitudinal direction and folds back and extends toward said another end of the fixing cover in the longitudinal direction through one of a route inside the fixing cover between the fixing rotator and an inner face of the fixing cover and a route outside the fixing cover.

Third Aspect

In a third aspect, the fixing cover in the fixing device according to the first aspect or the second aspect includes multiple ribs arranged at intervals in the longitudinal direction on one of the inner face of the fixing cover facing the fixing rotator and an outer face of the fixing cover to hold the harness.

Fourth Aspect

In a fourth aspect, a number of ribs arranged at a center region of the fixing cover in the fixing device according to the third aspect is smaller than a number of ribs arranged at an end region of the fixing cover in the longitudinal direction.

Fifth Aspect

In a fifth aspect, the fixing cover in the fixing device according to any one of the first to fourth aspects includes an entrance side plate, an exit side plate, a top plate, and an inclined plate. The entrance plate faces one side of the fixing rotator upstream from an entrance of the fixing nip in a rotation direction of the fixing rotator The exit side plate faces another side of the fixing rotator downstream from an exit of the fixing nip in the rotation direction. The top plate faces an upper part of the fixing rotator. The inclined plate connects the entrance side plate and the top plate. The route inside the fixing cover between the fixing rotator and the inner face of the fixing cover is disposed between the fixing rotator and the inclined plate, and the route outside the fixing cover is disposed outside the inclined plate.

Sixth Aspect

In a sixth aspect, the fixing rotator in the fixing device according to any one of the first to fifth aspects is a belt including a base layer and a release layer on the base layer.

Seventh Aspect

In a seventh aspect, the electric component in the fixing device according to any one of the first to sixth aspects is a planar heater including multiple heat generators arranged in the longitudinal direction.

Eighth Aspect

In an eighth aspect, an image forming apparatus includes the fixing device according to any one of the first to seventh aspects.

Ninth Aspect

In a ninth aspect, the image forming apparatus according to the eighth aspect further includes a fan generating an airflow to cool the fixing cover.

Tenth Aspect

In a tenth aspect, the fan in the image forming apparatus according to the ninth aspect is above the fixing cover in an imaginary X-Y coordinate system viewed from a front side of the image forming apparatus, and the harness is in a region, where the fan is disposed, divided from another region by an imaginary line passing through a rotation center of the pressure rotator and being orthogonal to an imaginary straight line connecting a center of the fan and a rotation center of the pressure rotator in the imaginary X-Y coordinate system.

Eleventh Aspect

In an eleventh aspect, the harness in the image forming apparatus according to the tenth aspect is below an imaginary horizontal line passing through a rotation center of the fixing rotator in the imaginary X-Y coordinate system.

Twelfth Aspect

In a twelfth aspect, the fan in the image forming apparatus according to any one of the ninth to eleventh aspects generates an airflow flowing from the one end to said another end of the fixing cover in the longitudinal direction.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A fixing device comprising:

a fixing rotator having a hollow portion inside the fixing rotator;

a fixing cover covering the fixing rotator and extending from one end to another end in a longitudinal direction of the fixing cover;

a pressure rotator contacting the fixing rotator to form a fixing nip;

an electric component disposed inside the hollow portion of the fixing rotator;

a harness connected to the electric component at a connection portion, the harness:

extending from the connection portion toward one end of the fixing cover outside the fixing rotator in the longitudinal direction; and folding back and extending toward said another end of the fixing cover in the longitudinal direction through one of:

a route inside the fixing cover between the fixing rotator and an inner face of the fixing cover; and a route outside the fixing cover.

2. The fixing device according to claim 1, wherein the fixing cover includes multiple ribs arranged at intervals in the longitudinal direction on one of:

the inner face of the fixing cover facing the fixing rotator; and an outer face of the fixing cover, to hold the harness.

3. The fixing device according to claim 2, wherein a number of ribs arranged at a center region of the fixing cover is smaller than a number of ribs arranged at an end region of the fixing cover in the longitudinal direction.

4. The fixing device according to claim 1, wherein the fixing cover includes:

an entrance side plate facing one side of the fixing rotator upstream from an entrance of the fixing nip in a rotation direction of the fixing rotator;

an exit side plate facing another side of the fixing rotator downstream from an exit of the fixing nip in the rotation direction;

a top plate facing an upper part of the fixing rotator; and an inclined plate connecting the entrance side plate and the top plate, wherein the route inside the fixing cover between the fixing rotator and the inner face of the fixing cover is disposed between the fixing rotator and the inclined plate, and the route outside the fixing cover is disposed outside the inclined plate.

5. The fixing device according to claim 1, wherein the fixing rotator is a belt including a base layer and a release layer on the base layer.

6. The fixing device according to claim 1, wherein the electric component is a planar heater including multiple heat generators arranged in the longitudinal direction.

7. An image forming apparatus comprising the fixing device according to claim 1.

8. The image forming apparatus according to claim 7, further comprising a fan generating an airflow to cool the fixing cover.

9. The image forming apparatus according to claim 8, wherein the fan is above the fixing cover in an imaginary X-Y coordinate system viewed from a front side of the image forming apparatus, and the harness is in a region, where the fan is disposed, divided from another region by an imaginary line passing through a rotation center of the pressure rotator and being orthogonal to an imaginary straight line connecting a center of the fan and a rotation center of the pressure rotator in the imaginary X-Y coordinate system.

10. The image forming apparatus according to claim 9, wherein the harness is below an imaginary horizontal line passing through a rotation center of the fixing rotator in the imaginary X-Y coordinate system.

11. The image forming apparatus according to claim 8, wherein the fan generates an airflow flowing from the one end to said another end of the fixing cover in the longitudinal direction.

12. A fixing device comprising:

a fixing rotator;

a fixing cover covering the fixing rotator and extending from one end to another end in a longitudinal direction of the fixing cover;

a pressure rotator contacting the fixing rotator to form a fixing nip;

an electric component disposed between the fixing rotator and the fixing cover;

a harness connected to the electric component at a connection portion, the harness:

extending from the connection portion toward one end of the fixing cover outside the fixing rotator in the longitudinal direction; and folding back and extending toward said another end of the fixing cover in the longitudinal direction through one of:

a route inside the fixing cover between the electric component and an inner face of the fixing cover; and a route outside the fixing cover.

13. An image forming apparatus comprising the fixing device according to claim 12.

14. The image forming apparatus according to claim 13, further comprising a fan generating an airflow to cool the fixing cover.

* * * * *